United States Patent Office 3,579,352
Patented May 18, 1971

3,579,352
EXTRUDER-COOKED CEREAL ENDOSPERM PARTICLES AND INSTANT BEVERAGE MIXES COMPRISING THE SAME
George N. Bookwalter, Peoria, Howard F. Conway, Pekin, and Edward L. Griffin, Jr., Peoria, Ill., assignors to the United States of America as represented by the Secretary of Agriculture
No Drawing. Filed Oct. 31, 1968, Ser. No. 772,380
Int. Cl. A23l 1/00, 1/10
U.S. Cl. 99—78
4 Claims

ABSTRACT OF THE DISCLOSURE

Cereal grain endosperms having a moisture content of 10–20% are heated at 325–400° F. in a screw-type extruder at a pressure of 2000–4000 p.s.i. The ejected material is milled to provide a cold water soluble product which is combined with soybean flour, nonfat dry milk solids, sugar, salt, minerals and vitamins to form an instant beverage mix.

A nonexclusive, irrevocable, royalty-free license in the invention herein described, throughout the world for all purposes of the United States Government, with the power to grant sublicenses for such purposes, is hereby granted to the Government of the United States of America.

FIELD OF THE INVENTION

This invention relates to the discovery that starch cereal grain endosperms including those of corn, rye, sorghum, rice, etc., that have been briefly cooked in a screw extruder under critically defined conditions and then ground and screened to provide a fraction consisting of a certain hereinafter described particle size distribution instantly disperse in highly aqueous media to provide palatable, nongritty beverages that do not thicken on standing.

This invention also relates to the discovery that the above extruder-cooked endosperm particle fraction can be formulated with appreciable and considerably varied proportions of other nutritional and flavor supplements to provide still more nourishing and flavorful instant beverage powders or bases consisting essentially of constituents corresponding to those of conventional CSM but wherein the extruder-cooked cereal grain endosperm component provides both an improved, substantially instantaneous dispersibility of the whole and a stable beverage-range viscosity that on the one hand prevents agglomerative formation and settling of gritlike particles that then cause an undue thinning and wateriness of the therewith produced beverage; and, on the other hand, is completely free of setback tendencies that would result in an undrinkably high viscosity or gel.

DESCRIPTION OF THE PRIOR ART

CSM is the trivial designation for the nutritionally balanced composition comprising about 64 percent roller-cooked degerminated corn meal and 29 percent toasted soy flour, plus nonfat dry milk solids, vitamins, and minerals that has been sent in very large amounts to underprivileged countries to improve the woefully inadequate nutrition, particularly of infants and young children. The presently known CSM is consumed only in the form of a relatively unappetizing cooked gruel or porridge because attempts to form a drinkable aqueous dispersion result in agglomeration of the particles that have a gritty feel and that settle very quickly, leaving an unappetizing, watery phase.

Aside from the clear advantage of being able to use an instantly dispersible food composition in beverage form as well as in the form of a cooked gruel or porridge, it is apparent that a modified CSM-type powder that can be dispersed in about seven parts by weight of water to provide a highly palatable beverage would overcome the general unavailability of fuel, stoves, and related cooking conveniences in highly primitive areas, which comprise the very places where the donated foodstuff is most sorely needed.

Although the critically cooked instantly dispersible, nongelling, starchy endosperm particles of the present invention per se can be employed as an instant beverage base, as well as a major component to instantize such nutritionally balanced formulations as CSM, it will be appreciated that minor and noncritical additions of a large variety of soluble or dispersible food components can be added in varied amounts or proportions in place of the CSM soy flour and defatted dry milk components where neither a nutritionally balanced beverage powder nor the very lowest possible cost are cardinal considerations.

A variety of cooked starchy cereal products are well known, the oldest probably being the macroscopic nondispersible kernels sold under the familiar propietary names "Puffed Wheat" and "Puffed Rice," whereof the starch is completely cooked, excessively degraded, and embrittled just short of the scorching point as indicated by the presence of at least one very dark brown to black spot on many of the kernels. Such highly degraded starch cannot stabilize suspensions, and the attempted beverage will be thin and gritty.

More recently, starchy cereal grains have been fully cooked in screw-type extruders to provide a variety of highly friable, distinctively flavored and shaped snack items, but again, even if reduced to very small particles, the fully cooked starch thereof could not hydrate to provide the relatively low but critical viscosity required to prevent particle aggregation and to maintain an essentially homogeneous suspension of the particles.

On the other hand, such cereals that ordinarily require about 5 min. of cooking in relatively large amounts of water to only partially degrade the starch, whereby is produced the undrinkably high viscosities characteristic of cooked oatmeal, farina, and "Cream of Wheat," now are incompletely precooked and degraded, presumably on hot rolls, to provide instantized cereals that gel after the addition of a hot liquid.

Thus, while the general effects of cooking and thermal degradations on starch viscosity are known, none of the prior art cereal grain products would be operative for preparing an instant beverage base that disperses practically instantly in water or milk to provide a nourishing low-cost, largely carbohydrate beverage or, if fortified, a nutritionally balanced stable beverage that has a smooth, nongritty mouthfeel. By the same token, while raw particles of cereal grain endosperm settle very rapidly from suspension and exert no viscosity effect, the knowledge that the settling tendency of a corn meal slurry is markedly reduced by cooking for a few minutes is of no value to the present invention because fully cooked cereal grain endosperm slurries having a 10-percent solids content, e.g., cooked oatmeal, set back to a thick paste or gel.

A primary object of our invention is the provision of a process for converting predominantly starchy cereal grain endosperm meals, e.g., those of corn, grain, sorghum, rye, oats, barley, wheat, etc., to critically precooked small particles that are practically instantly dispersible in about seven parts of even a chilled highly aqueous medium such as refrigerated water or milk to provide a nutritious, stable, homogeneous, nonsettling, nongritty beverage.

A more specific object is the provision of a process for converting cereal grain endosperms to instantly dispersible particles suitable for use as the sole or the major component of an instant beverage base wherein starchy cereal grain endosperms, i.e., degerminated cereal grains, pretempered to an internally equilibrated moisture content of 10–20 percent are cooked so that the starch thereof is critically degraded and gelatinized, in the presence of only the therein contained temper moisture, by 20–60 seconds of residence in a screw extruder having an orifice and wherein the internal temperature is about 325° to about 400° F. and wherein the pressure as measured at the said orifice is about 2000 p.s.i. to about 4000 p.s.i., and further whereby the critically cooked starchy endosperm material issuing therefrom is roll milled to provide critically cooked particles, 9 percent Brabender test aqueous dispersions of the ground cooked particles which are characterized by Brabender Amylograph 29° cold paste viscosities of 100–250 Brabender units, the roll-milled particles then being screened to provide a fraction in which the particles predominantly are characterized by a size smaller than 30 mesh but larger than 60 mesh, said particles being accompanied by not more than 15 percent, and preferably at most only 12 percent, based on the total weight of particles, of fines smaller than 100 mesh.

A still more specific and highly preferred object of the present invention is the preparation of a nutritionally adequate instant beverage base substantially corresponding in its constituents and carbohydrate, fat, and protein contents to CSM by using a hereby processed starch endosperm particle, preferably of corn origin, in place of the inoperative hot roll partially cooked corn endosperm component of the presently known CSM.

Other objects and advantages of the above described and herein claimed invention will be apparent to those skilled in the art from a reading of the examples, and it is recognized that many obvious alterations can be made without departing from the spirit of the herein described invention as defined in the appended claims.

Summary of the invention

In accordance with the broad objects of the invention, we have now discovered that the said objects are achieved by the process wherein the starchy endosperms of cereal grains including those of corn, rye, grain sorghum, etc., if internally tempered to a critical moisture content of 10–20 percent, are then cooked for 20–60 seconds at 325°–400° F. by residence for the said number of seconds in a screw-type extruder having an orifice, the pressure of which measured at the orifice being from about 2000 p.s.i. to about 4000 p.s.i., and wherein the therefrom ejected critically cooked endosperm ribbons are subsequently ground between differential rollers having about 10 corrugations per inch and wherein fractionated, vide infra, the roller-ground particles being critically characterized by exhibiting Brabender Amylograph 29° C. cold paste viscosity values of 100–250 Brabender units when a 9 percent (dry basis) aqueous dispersion of the particles is subjected to a standard Brabender Amylograph test cycle, and wherein the roller-ground particles then are screened to provide a fraction whereof at least about 60 percent of the particles are smaller than 30 mesh but larger than 60 mesh and preferably wherein the said fraction is further characterized by also comprising not more than at most 15 percent (by weight) and preferably only 12 percent of smaller than 100 mesh fines that are conducive to the formation of poorly wettable balls or lumps when the beverage is formed by hand mixing instead of with an electric mixer or blender.

Example 1

Degerminated corn endosperm meal (20 lb.) that had been tempered and equilibrated for several hours to a uniform moisture content of 13 percent was fed into a small-size electrically driven and heated commercial-type plastics extruder of which the screw element provided a compression ratio of 3:1 and an internal pressure of about 2800 p.s.i. The internal temperature of the extruder was 375° F., and the retention time of the meal was about 30 seconds. The critically cooked meal issuing from the extruder orifice as an irregularly segmented frangible strand or ribbon then was ground between corrugated rollers having 10 corrugations per inch which were operated at a rotational differential of 1.5:1.

A standard Brabender Amylograph cycle using 500 g. of a 9 percent (d.b.) aqueous dispersion of the extruder-cooked roller-ground particles gave a 29° C. cold paste viscosity value of 170 Brabender units and a 50° C. cooked paste value of 60 units. By comparison, identically ground corn endosperms that were tempered to a 30 percent moisture content and then cooked by passage between rollers heated to 425° F. showed a Brabender cold paste viscosity of 800 Brabender units and a 50° C. cooked paste value of 395 Brabender units. Corn endosperm meal pretempered to a 20 percent moisture content and then roller cooked at 540° F. gave a 29° C. cold paste viscosity of 640 Brabender units, and the 9 percent aqueous dispersion gave a 50° C. cooked paste value of 260 Brabender units, whereas in accordance with somewhat different but operative parameters of our invention, corn endosperms that were pretempered to a 13 percent moisture content and then were extruder cooked for about 30 seconds at 375° F. under an orifice pressure of about 3500 p.s.i. gave Brabender 29° C. cold paste and hot (50° C. cooked) paste values of 170 units and 60 Brabender units, respectively. A critical and identifying characteristic of the operative cooked endosperm materials of our invention has been found to be the presence of Brabender 29° C. cold paste values ranging from about 100 Brabender units to about 250 Brabender units. With values appreciably below 100 units a 12.5 solids content beverage comprising the improperly cooked endosperm particles is thin and grainy with extensive settling of the solids, while at Brabender values above about 250 units, the beverage is practically a gel.

Meal particles 40 mesh or larger that were removed on a 40 mesh screen were reground and then added back to provide a more finely divided meal having the following particle size distribution in weight percent as shown by the following retentions on the indicated series of U.S. standard screens as shown in Table I.

TABLE I

| | Percent |
|---|---|
| On 40 mesh | 3 |
| On 60 mesh | 63 |
| On 80 mesh | 10 |
| On 100 mesh | 12 |
| Fines (smaller than 100 mesh) | 12 |

The above extruder-cooked powder was substituted for the roll-cooked corn component in an otherwise prior art conventional CSM formulation but modified to include sugar and table salt to provide the parts by weight formulation shown in Table II, which formulation, analyzing 19.5 percent protein (dry basis) and 2.0 percent fat (dry basis), was usable as an "instant" beverage mix.

TABLE II

| | Percent |
|---|---|
| Extruder-cooked degerminated corn particles | 61 |
| Defatted toasted soybean flour, refatted to 6% | 22 |
| Nonfat dry milk solids | 5 |
| Minerals and vitamins | 2 |
| Table salt | 2 |
| Sucrose | 8 |

A beverage was easily prepared simply by adding 25 g. of the above formulation to 175 ml. of cold water in a lidded shaker and shaking by hand for about 5 seconds. The resulting beverage had a 25° C. Brookfield viscosity of 280 cps. and was stable, smoothly homogeneous, and free of lumps and grittiness.

In place of the herein employed particles, fines thereof can be agglomerated in known manner and the inoperatively large aggregates then remilled and fractionated in the described manner for use herein.

For information purposes, the Brookfield viscosities at various aqueous concentrations of the extruder-cooked corn endosperm particles per se are set forth in Table III.

TABLE III

| Extruder-cooked corn endosperm solids, percent: | Brookfield viscosity, cps. |
|---|---|
| 2.5 | 4.8 |
| 5.0 | 50.0 |
| 7.6 | 344 |
| 10.0 | 1992 |
| 12.5 | 11360 |

Example 2

Ten pounds of degerminated grain sorghum brewers' grits were tempered with 15 percent moisture which was then internally equilibrated for several hours. The tempered grits were then fed into the same screw extruder used in Example 1 and therein were subjected to the same conditions. The friable extrudate was then ground on the previously described corrugated rollers, and then fractionated on a 40 mesh screen to remove the larger particles. The particles retained thereon were reground and rescreened as before to provide a fraction for adding back to the main fraction, following which the sieve analysis of the particle size distribution was virtually identical with that of Example 1. The finely divided extruder-cooked grain sorghum was substituted for the cooked degerminated corn particles and formulated precisely as in Table II, excepting that full-fat soy flour was substituted for defatted, toasted soybean flour, to provide an "instant" beverage mix analyzing 18.3 percent, dry basis, of protein and 5.7 percent of fat. A smooth, highly palatable beverage was obtained by stirring 25 g. of the mix into 175 ml. cold water with a fork. The beverage had a Brookfield viscosity of 80 cps.

Example 3

Whole rye kernels were pearled, thereby removing about 41 percent of their weight in the form mainly of hull and germ along with some endosperm. The pearled kernels, internally equilibrated to a 17 percent moisture content, were fed to the previously described extruder cooker and therein were subjected to precisely the same conditions.

The extruded strand material was ground between the previously described rollers, the particles retained on a 40 mesh screen being reground. Sieve analysis showed the particle size distribution to be almost identical with that of the corn material of Example 1 excepting that 71 percent instead of 63 percent of the particles were retained on the 60 mesh sieve and only 9 percent of the particles were fines passing through the 100 mesh sieve.

After being formulated with the other CSM ingredients precisely as in Example 2, a 25-g. portion of the resulting "instant" beverage mix, analyzing 17.5 percent protein and 6.0 percent fat, was stirred by hand into 175 ml. cold water to obtain a smooth, palatable beverage that was completely free of lumps or sediment, and exhibited a Brookfield viscosity of 820 cps.

We claim:

1. The process wherein starchy cereal grain endosperms having an internally equilibrated moisture content of 10–20 percent are subjected to from 20 seconds to about 60 seconds of residence at a temperature of 325°–400° F. in a screw-type extruder exhibiting an orifice pressure of from 2000 p.s.i. to about 4000 p.s.i., then milling the therefrom ejected cooked endosperm material between 1.5:1 differential rollers having about 10 corrugations per inch to provide cooked endosperm particles that are characterized by exhibiting a 29° C. cold paste viscosity of 100–250 Brabender units when a 9 percent (dry basis) aqueous dispersion thereof is subjected to a Brabender Amylograph test, and screening the milled particles to provide a particle fraction wherein at least about 60 percent thereof are particles smaller than 30 U.S. mesh but larger than 60 U.S. mesh.

2. The process as defined in claim 1 wherein the cereal grain member is corn, the residence time is 30 seconds, the temperature is 375° F., the extruder orifice pressure is 2800 p.s.i., the Brabender cold paste viscosity value is 170 Brabender units, and wherein the particle fraction is additionally characterized by comprising only 12 percent of smaller than 100 mesh fines.

3. The product produced by the process of claim 2.

4. A CSM-type instant beverage formulation having the following approximate weight percent composition:

| | |
|---|---|
| Product of claim 3 | 61 |
| Toasted soybean flour | 22 |
| Nonfat dry milk solids | 5 |
| Minerals and vitamins | 2 |
| Table salt | 2 |
| Sugar | 8 |

References Cited

UNITED STATES PATENTS

| 3,097,947 | 7/1963 | Kemmerer | 99—64X |
| 3,251,702 | 5/1966 | Stickley et al. | 99—82X |
| 3,458,321 | 7/1969 | Reinhart et al. | 99—80 |

MORRIS O. WOLK, Primary Examiner

S. B. DAVIS, Assistant Examiner

U.S. Cl. X.R.

99—28, 64, 80